US012768428B2

(12) United States Patent
Hwang et al.

(10) Patent No.: US 12,768,428 B2
(45) Date of Patent: Oct. 20, 2026

(54) METHOD FOR IMPROVING VEHICLE NOISE AND ITS CONTROL DEVICE

(71) Applicants: HYUNDAI MOTOR COMPANY, Seoul (KR); KIA CORPORATION, Seoul (KR)

(72) Inventors: Jae Woong Hwang, Hwaseong-si (KR); Si Yoong Kim, Hwaseong-si (KR); Sukil Oh, Hwaseong-si (KR); Seock Chan Kang, Hwaseong-si (KR); HoYoung Jeong, Hwaseong-si (KR); DaeGeon Yoon, Hwaseong-si (KR); Kun Hee Lee, Hwaseong-si (KR); Chang Kook Chae, Hwaseong-si (KR); Sung Baeck Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 83 days.

(21) Appl. No.: 18/825,547

(22) Filed: Sep. 5, 2024

(65) Prior Publication Data

US 2025/0146554 A1 May 8, 2025

(30) Foreign Application Priority Data

Nov. 3, 2023 (KR) ........................ 10-2023-0150682

(51) Int. Cl.
*F16F 15/14* (2006.01)
*F16F 15/00* (2006.01)

(52) U.S. Cl.
CPC .......... *F16F 15/145* (2013.01); *F16F 15/002* (2013.01)

(58) Field of Classification Search
None
See application file for complete search history.

(56) References Cited

U.S. PATENT DOCUMENTS

2021/0189980 A1 * 6/2021 Parsels ................ F02D 41/3058

FOREIGN PATENT DOCUMENTS

CN 111886150 A * 11/2020 ............... F16H 7/12

* cited by examiner

*Primary Examiner* — Vicky A Johnson
(74) *Attorney, Agent, or Firm* — MCDONNELL BOEHNEN HULBERT & BERGHOFF LLP

(57) ABSTRACT

A method for improving vehicle noise, which improves noise generated from a centrifugal pendulum absorber (CPA) after a vehicle turns off includes collecting real-time driving information according to an operation of the vehicle through a driving information detector, determining whether the idle condition is satisfied based on the real-time driving information; determining whether a transmission P stage is engaged and whether a brake operates when the idle condition is satisfied, and reducing rotation of a CPA mounted turbine applied to a torque converter through at least one of transmission clutch and brake operations at a time when an engine turning-off signal is input in a state of satisfying the transmission P stage engagement or brake operation condition.

6 Claims, 6 Drawing Sheets

| | UD/C [C1] | 6/C [C2] | 4&OD/C [C3] | 35R/B [C4] | 8LR/B [B1] | 27/B [B2] | F1 |
|---|---|---|---|---|---|---|---|
| P | | | | ● | | ● | |
| R | | | | ● | ● | | |
| N | | | | | ● | | |
| D1 | ● | | | | | | |
| D2 | ● | | | | | ● | |
| D3 | ● | | | | | | |
| D4 | ● | | ● | | | | |
| D5 | | | ● | ● | | | |
| D6 | | ● | ● | | | | |
| D7 | | | ● | | | ● | |
| D8 | | | ● | | ● | | |

<Simulation modeling of present disclosure>

<Simulation comparison result before/after application of present disclosure>

<CPA noise generation phenomenon>

METHOD FOR IMPROVING VEHICLE NOISE AND ITS CONTROL DEVICE

CROSS REFERENCE TO RELATED APPLICATIONS

This application claims priority to and the benefit of Korean Patent Application No. 10-2023-0150682 filed in the Korean Intellectual Property Office on Nov. 3, 2023, the entire contents of which are incorporated herein by reference.

BACKGROUND

(a) Field

The present disclosure relates to a method for improving vehicle noise and its control system, and more particularly, to a method for improving vehicle noise and its control device, which improves noise generated from a centrifugal pendulum absorber (CPA) after a vehicle turns off.

(b) Description of the Related Art

In general, a centrifugal pendulum absorber (CPA) applied to a driving system of an automatic transmission vehicle serves to offset engine rotation vibration by generating opposite vibration to vibration generated when an engine rotates. The CPA has an advantage in that the vibration by the engine rotation is offset to increase a ride comfort and quietness, and contribute to enhancement of fuel efficiency. Accordingly, in order to simultaneously satisfy target fuel efficiency achievement and NVH performance securing which have contradiction performance, the CPA is applied to various vehicle types.

However, since there is a case where noise such as 'clicking' is generated at a time of 1.5 to 3 seconds after the turning-off of the vehicle is completed, the CPA requires a countermeasure.

For example, FIGS. 5 and 6 illustrate a centrifugal pendulum absorber (CPA) applied to a driving system to a vehicle and a noise generation phenomenon thereof.

Referring to FIG. 5, in a CPA 10 configured in a torque converter of the vehicle, six masses 11 which are equipped with a spring therein, and perform a pendulum movement is disposed in a circular shape around a flange 12 based on a central axis C. The CPA masses 11 which perform the pendulum movement moves in an opposite direction to rotary vibration when an engine rotates to server to offset vibration generated from the driving system overall.

However, after the vehicle is turned off, when a turbine and the CPA 10 rotate at a low speed, a free fall occurs by a self load of the CPA mass 11 due to the lack of centrifugal force, and as a result, impact noise (hereinafter, referred to as 'noise") may be caused.

Referring to FIG. 6, a CPA noise generation phenomenon confirmed through a test is described below.

In a general vehicle driving condition, the CPA mass 11 behaves in the same direction at a center of a trajectory by the centrifugal force, but the CPA mass 11 rotates at a low speed (<200 rpm) upon a vehicle being turned off, and is influenced by a gravity, which causes a relative movement (behavior) between the CPA masses 11. This has a problem in that due to rotary behavior of a transmission input shaft and case vibration, noise of a sixth component (6 CPA masses mean that an event generated per one rotation is generated due to impact noise).

Accordingly, in order to further secure a customer quality for multi-model/multi-type vehicles under a trend of expanding CPA application, improvement of a noise problem which occurs after the vehicle is required to be turned off.

The above information disclosed in this Background section is only for enhancement of understanding of the background of the disclosure and therefore it may contain information that does not form the prior art that is already known in this country to a person of ordinary skill in the art.

SUMMARY

An exemplary embodiment of the present disclosure attempts to provide a method for improving vehicle noise and its control device, which advance a noise generation time of a centrifugal pendulum absorber (CPA) to a turning-off operating time of an engine based on a turning-off time by executing noise improvement logic upon a vehicle being turned off to prevent a driver from hearing CPA noise.

An exemplary embodiment of the present disclosure provides a method for improving vehicle noise, which improves noise generated from a centrifugal pendulum absorber (CPA) after a vehicle is turned off, which includes collecting real-time driving information according to an operation of the vehicle through a driving information detector; determining whether an idle condition is satisfied based on the real-time driving information; determining whether a transmission P stage is engaged and whether a brake operates when the idle condition is satisfied; and reducing rotation of a CPA mounted turbine applied to a torque converter through at least one of transmission clutch and brake operations at a time when an engine turning-off signal is input in a state of satisfying the transmission P stage engagement or brake operation condition.

Further, the method may further include, after the determining of whether the transmission P stage is engaged and whether the brake operates, engaging the transmission P stage immediately when the engine turning-off signal is input in a state of not satisfying the transmission P stage engagement and brake operation conditions of the vehicle; and reducing the rotation of the CPA mounted turbine applied to the torque converter through at least one of the transmission clutch and brake operations after the transmission P stage engagement.

In addition, in the reducing of the rotation of the CPA mounted turbine, the turbine rotation stop time is advanced so as for the rotation of the CPA mounted turbine to stop in the same time zone as the turning-off operating time of the engine from a time of recognizing the engine turning-off signal.

Further, the reducing of the rotation of the CPA mounted turbine may include performing turbine rotation stop control by operating any one of an under-drive clutch (UD-C), an over-drive clutch (OD-C), and a low-reverse brake (LR-B) of the transmission.

Meanwhile, another exemplary embodiment of the present disclosure provides a control device for improving vehicle noise, which improves noise generated from a centrifugal pendulum absorber (CPA) after a vehicle is turned off, which includes a driving information detector detecting real-time driving information required for controlling improvement of CPA noise from various sensors according to an operation of the vehicle; and a controller reducing rotation of a CPA mounted turbine applied to a torque converter through at least one of transmission clutch and brake operations when an engine turning-off signal is input in a state of satisfying an idle condition according to the real-time driving information, and satisfying a transmission P stage engagement or brake operation condition.

Further, the controller engages the transmission P stage immediately when the engine turning-off signal is input in a state of not satisfying the transmission P stage engagement and brake operation conditions of the vehicle, and then reduces the rotation of the CPA mounted turbine applied to the torque converter through at least one of the transmission clutch and brake operations.

In addition, the driving information detector detects real-time driving information including at least one of an engine start state (ON/OFF), an engine RPM, a transmission TM state, a TM clutch state, a brake pedal sensor (BPS), and a vehicle speed, and delivers the detected real-time driving information to the controller.

According to an exemplary embodiment of the present disclosure, there is a CPA noise improvement effect in which a CPA noise generation time is advanced to a turning-off operating time of an engine through noise improvement logic of the present disclosure when a vehicle is turned off to prevent a driver from hearing noise.

Further, by improving a CPA noise problem through a program that applies the noise improvement logic to an existing control device without adding separate hardware to the vehicle, there is an effect in that a vehicle noise problem can be resolved with low cost.

In addition, the method for improving the CPA noise of the present disclosure, which includes the effects is applied to multi-model/multi-type vehicles to expect a customer satisfaction enhancement effect depending on increased productivity.

DETAILED DESCRIPTION

Figure 1:
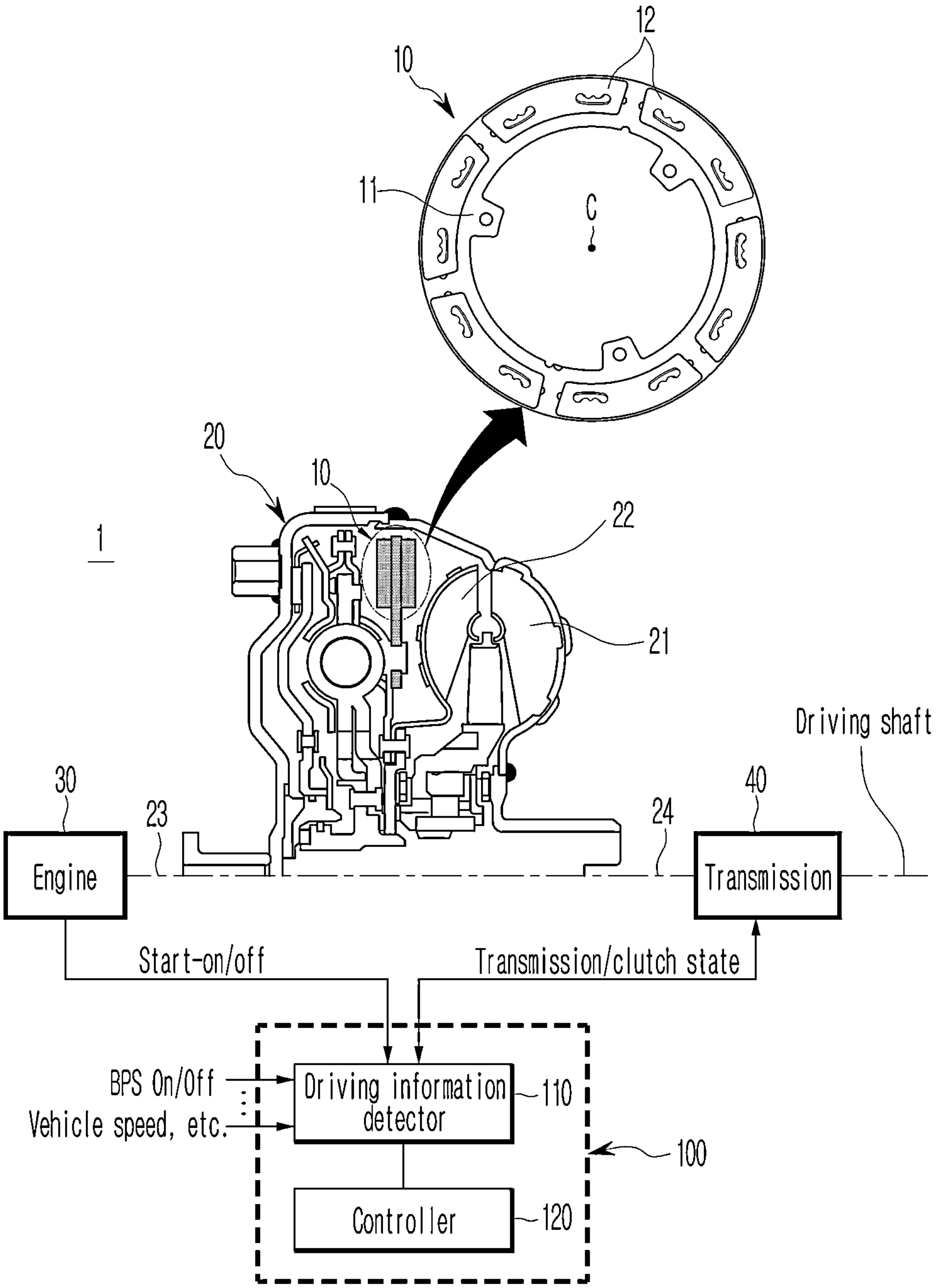
FIG. 1 schematically illustrates a configuration of a control device for improving noise applied to a vehicle according to an exemplary embodiment of the present disclosure.

Hereinafter, exemplary embodiments of the present disclosure will be described in detail so as to be easily implemented by those skilled in the art, with reference to the accompanying drawings.

The terms used here are only for describing specific exemplary embodiments, and are not intended to limit the present disclosure. As used here, the singular forms are also intended to include plural forms, unless they are explicitly differently indicated by context. It will be appreciated that when terms "include" and/or "including" are used in this specification, the terms "include" and/or "including" are intended to designate the existence of mentioned features, integers, steps, operations, constituent elements, and/or components, but do not exclude the existence or addition of one or more other features, integers, steps, operations, constituent elements, components, and/or groups thereof. As used here, the terms "and/or" include any one or all combinations of the items which are associated and listed.

Terms including as first, second, A, B, (a), (b) and the like are used for describing various constituent elements, but the constituent elements are not limited by the terms throughout the specification. These terms are just intended to distinguish the components from other components, and the terms do not limit the nature, sequence, or order of the components.

It should be understood that, when it is described that a component is "connected to" or "accesses" another component throughout the specification, the component may be directly connected to or access the other component or a third component may be present therebetween throughout the specification. In contrast, it should be understood that, when it is described that a component is "directly connected to" or "directly accesses" another component, it is understood that no element is present between the element and another element.

Throughout the specification, used terms are used only to describe specific exemplary embodiments, and are not intended to limit the present disclosure. A singular form includes a plural form if there is no clearly opposite meaning in the context.

Additionally, it is appreciated that one or more or at least one of the following methods or aspects thereof can be executed by one or more controllers. The term "controller" may refer to a hardware device including a memory and a processor. The memory is configured to store program instructions, and the processor is particularly programmed to execute the program instructions in order to perform one or more processes which are described below in more detail. As disclosed here, the controller may control units, modules, parts, devices, or operations of those similar thereto. Further, as recognized by those skilled in the art, it is appreciated that the following methods may be executed by a device including the controller jointly with one or more other components.

Hereinafter, a method for improving vehicle noise and its control device according to exemplary embodiments of the present disclosure will be described in detail with reference to drawings.

FIG. 1 schematically illustrates a configuration of a control device for improving noise applied to a vehicle according to an exemplary embodiment of the present disclosure.

Referring to FIG. 1, a control device 100 for improving noise of a centrifugal pendulum absorber (CPA) 10 applied to a torque converter 20 of a vehicle 1 according to an exemplary embodiment of the present disclosure is included.

The vehicle 1 may be an internal combustion engine vehicle, a hybrid electric vehicle (HEV), and a mild HEV (MHEV) including an engine 30 and a transmission 40.

The engine 30 may generate power required for driving the vehicle by combustion of fuel, and include an ISG (idle stop & go) (also referred to as "auto stop") function for limiting an idle and enhancing fuel efficiency.

The transmission 40 has a transmission gear embedded therein, and converts the power of the engine 30 into required rotary force according to a speed, and transmits the rotary force. For example, the transmission 40 may be configured as an 8-speed automatic transmission which may implement 8 forward shift stages by using a plurality of planetary gear sets.

A torque converter 20 is positioned between the engine 30 and the transmission 40 to transmit power in the form of fluid coupling.

The torque converter 20 includes an impeller 21 which is connected to an engine output shaft 23 and operates, and a turbine 22 which faces the impeller 21, and is connected to a transmission input shaft 24 and operates, and has a structure in which a centrifugal pendulum absorber (CPA) 10 absorbing vibration is rotatably mounted on (coupled to) the turbine 22.

In the CPA 10, a plurality of masses (also referred to as “mass body”) 11 which are equipped with a spring and perform a pendulum movement are disposed in a circular shape around a flange 12 based on a central axis C. In the CPA 10, the plurality of masses 11 which perform the pendulum movement moves in an opposite direction to rotary vibration when an engine 30 rotates to server to offset vibration generated from the driving system overall. For example, the CPA 10 according to an exemplary embodiment of the present disclosure may be configured to include sixth masses 11. However, the present disclosure is not limited thereto, and the CPA 10 may be implemented by placing two or more masses 11.

Meanwhile, as described in the technology which becomes a background of the present disclosure, there is a problem in that noise is generated due to impact between the mass 11 and the flange 12 of the CPA 10 approximately 2 to 3 seconds after engine turning-off is completed in the CPA 10 applied vehicle in the related art.

In order to solve the problem, the control device 100 according to an exemplary embodiment of the present disclosure is configured by a computing system that stores, in a recording medium, at least one program and data for improving the noise of the CPA 10 applied to the torque converter of the vehicle, and perform noise improvement logic by executing the program.

For example, the control device 100 includes a driving information detector 110 and a controller 120.

The driving information detector 110 detects real-time driving information required for CPA noise improvement control from various sensors and/or devices including the engine 30 and the transmission 40 according to an operation of the vehicle, and delivers the detected real-time driving information to the controller 1. The driving information may include at least one of an engine start state (ON/OFF), an engine RPM, a transmission TM state, a TM clutch state, a brake pedal sensor (BPS), and a vehicle speed.

The driving information detector 110 may be an input/output interface having various communication means such as a controller area network (CAN), a local interconnect network (LIN), FlexRay, EtherNet, serial, etc., and may be connected to various devices such as the engine 30 and the transmission 40 or control units and/or sensors applied to various devices through a vehicle network.

The controller 120 controls an overall operation of the vehicle based on the driving information collected in real time, and performs noise improvement control logic of stopping the input shaft of the transmission within 1 second from a start time of the vehicle being turned off.

The controller 120 advances a noise generation time of the CPA (an example of the related art: 2 to 3 seconds) to a time within a turning-off operating time (an example of the present disclosure: within 1 second) of the engine 30 through the noise improvement control logic to prevent a driver from hearing the noise of the CPA. That is, consequently, even though the noise is generated from the CPA the controller 120 has a purpose of improving the driver not to hear the noise by controlling a generation time of the noise to be the same as the turning-off operating time of the engine.

For such a purpose, the controller 120 may be implemented by one or more processors which operate by a set program and the set program may be programmed to perform each step of the method for improving the vehicle noise according to an exemplary embodiment of the present disclosure.

The vehicle noise improving method will be described in more detail with reference to the following drawing.

Figure 2:
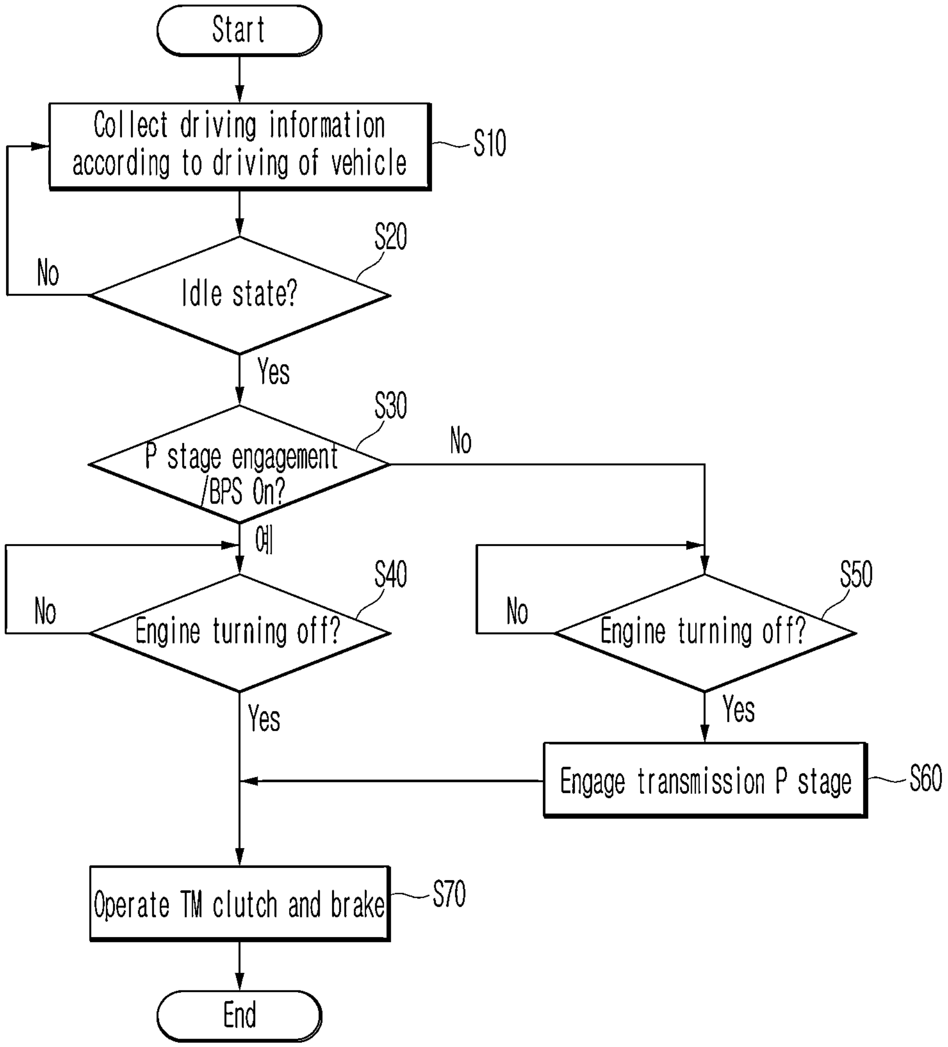
FIG. 2 is a flowchart schematically illustrating a method for improving vehicle noise according to an exemplary embodiment of the present disclosure.

FIG. 2 is a flowchart schematically illustrating a method for improving vehicle noise according to an exemplary embodiment of the present disclosure.

Referring to FIG. 2, a controller 120 according to an exemplary embodiment of the present disclosure collects real-time driving information according to an operation of a vehicle through a driving information detector 110 (S10). For example, the controller 120 may collect driving information including at least one of an engine start state (ON/OFF), an engine RPM, a transmission TM state, a TM clutch state, a brake pedal sensor (BPS), and a vehicle speed. Further, the controller 120 may further collect vehicle driving information of a driver not mentioned here.

The controller 120 determines whether an idle condition of a vehicle is satisfied based on real-time driving information in order to check a vehicle stop state (S20). The controller 120 may determine that the idle condition is satisfied when the engine RPM is equal to or less than a predetermined value in the vehicle stop state (vehicle speed=0).

In this case, the controller 120 determines that a current vehicle state is not the vehicle stop state, and continuously checks the real-time driving information when the idle condition is not satisfied (S20, No).

On the contrary, the controller 120 determines whether a parking (P) stage of the transmission of the vehicle is engaged and whether a brake is operated (BPS On) in order to check a vehicle stop will of the driver when the idle condition is satisfied (S20, Yes) (S30).

In this case, the controller 120 waits for inputting an engine turning-off signal in a state of satisfying the transmission P-stage engagement or brake operation (BPS On) condition of the vehicle (S30, Yes) (S40).

When the waiting engine turning-off signal is input (S40, Yes), the controller 120 reduces rotation of a CPA mounted turbine 22 applied to a torque converter 20 through at least one of a TM clutch and a brake operation at the time when the engine turning-off signal is input (S70).

Here, the TM clutch and the brake operation are to quickly stop low-speed rotation of the CPA 10 mounted on the turbine 22 upon the engine turning-off to make the stop time be the same as the engine turning-off operating time. Accordingly, the CPA noise is generated at the time of 1.5 to 3 seconds after the vehicle is turned off in the related art, while, the controller 120 of the present disclosure controls the rotation of the CPA mounted turbine to be stopped within approximately 0.5 to 1 second from a time of recognizing the engine turning-off signal to advance the turbine rotation stop time so as for the turbine to stop in the same time zone as the turning-off operating time (e.g., within 1 second) of the engine 30. Through such noise improvement control, the driver may be prevented from hearing the CPA noise due to a turning-off operating sound of the engine 30.

Meanwhile, in step S30 above, the controller 120 determines whether the engine turning-off signal is input in a state of not satisfying the transmission P-stage engagement or brake operation (BPS On) condition of the vehicle (S30, No) (S60).

In this case, when the engine turning-off signal is input in a transmission D, N, or R stage (S50, Yes), the controller 120 immediately engages a transmission P stage (S60), and quickly operates the TM clutch or brake to reduce the rotation of the CPA mounted turbine (S70). As one example, even when the vehicle in the idle state satisfies a determined auto stop condition in a transmission P stage non-engagement state and is turning-off, the P stage may be preferentially engaged, and then the stop time of the CPA may be quickly advanced.

However, when the TM clutch or brake operation is performed in the transmission P stage non-engagement state (S60 omitted), there is a possibility that the vibration of the vehicle and the noise of the driving system will be generated, so the transmission P stage should be preferentially engaged. That is, it may be appreciated that in order to secure the noise improvement effect of the present disclosure, a transmission P stage engagement condition is required before the TM clutch or brake operation is performed, and the P stage engagement is preferentially forced in the P stage non-engagement state.

Figure 3:
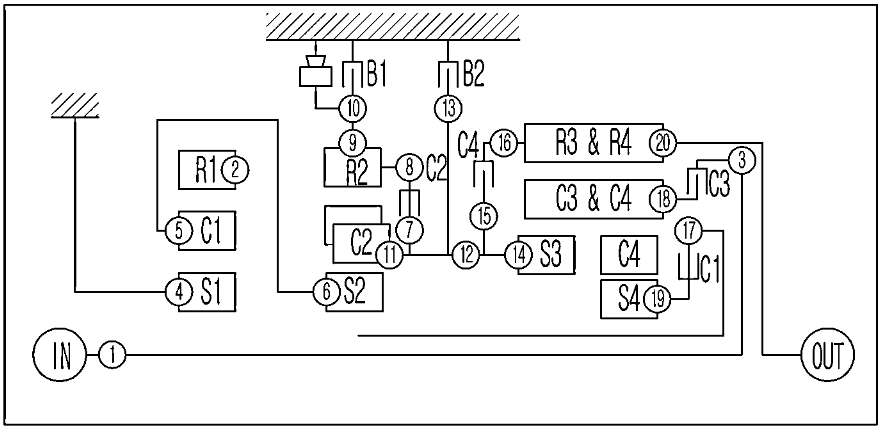
FIG. 3 illustrates a P-N-D stage control situation table upon idle stop according to an exemplary embodiment of the present disclosure.

Meanwhile, FIG. 3 illustrates a P-N-D stage control situation table upon idle stop according to an exemplary embodiment of the present disclosure.

Referring to FIG. 3, a P-N-D stage control situation table is shown upon idle stop by using a rear-wheel 8-speed transmission applied to the vehicle as an exemplary embodiment. Here, according to the present disclosure, in step S70 of the vehicle noise improving method, a P stage control situation (marked with dotted lines) is referenced for controlling the TM clutch and brake operations.

The controller 120 may perform turbine rotation stop control by operating any one of an under-drive clutch (UD-C), an over-drive clutch (OD-C), and a low-reverse brake (LR-B) of the transmission 40 in order to stop the rotation or reduce the speed of the transmission input shaft in a transmission P stage engagement condition upon turning-off of the vehicle in step S70.

That is, in the control situation table, C4 and B2 fix an output shaft upon engagement of the transmission P stage, and in this case, the input shaft rotates. Accordingly, in order to reduce a rotational speed or stop the input shaft on which the CPA 10 is mounted upon the vehicle turning off, one of the UD-C, the OD-C, and the LR-B is operated.

The TM clutch and brake operations may optimize slip by using reserve (small) hydraulic pressure of the existing residual clutch, and detailed tuning for the optimization may be trained through a test, a simulation or set through a designated algorithm (e.g., a program and a probability model).

Figure 4:
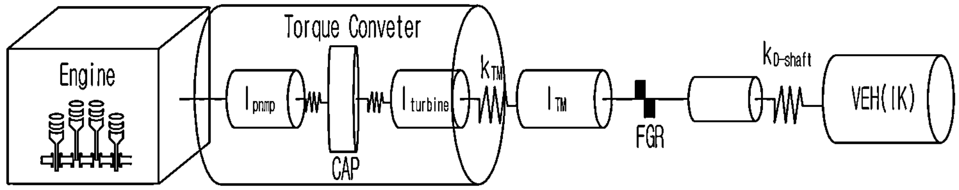
FIG. 4 illustrates a simulation comparison result before and after application of the method for improving vehicle noise according to an exemplary embodiment of the present disclosure.
Figure 4:
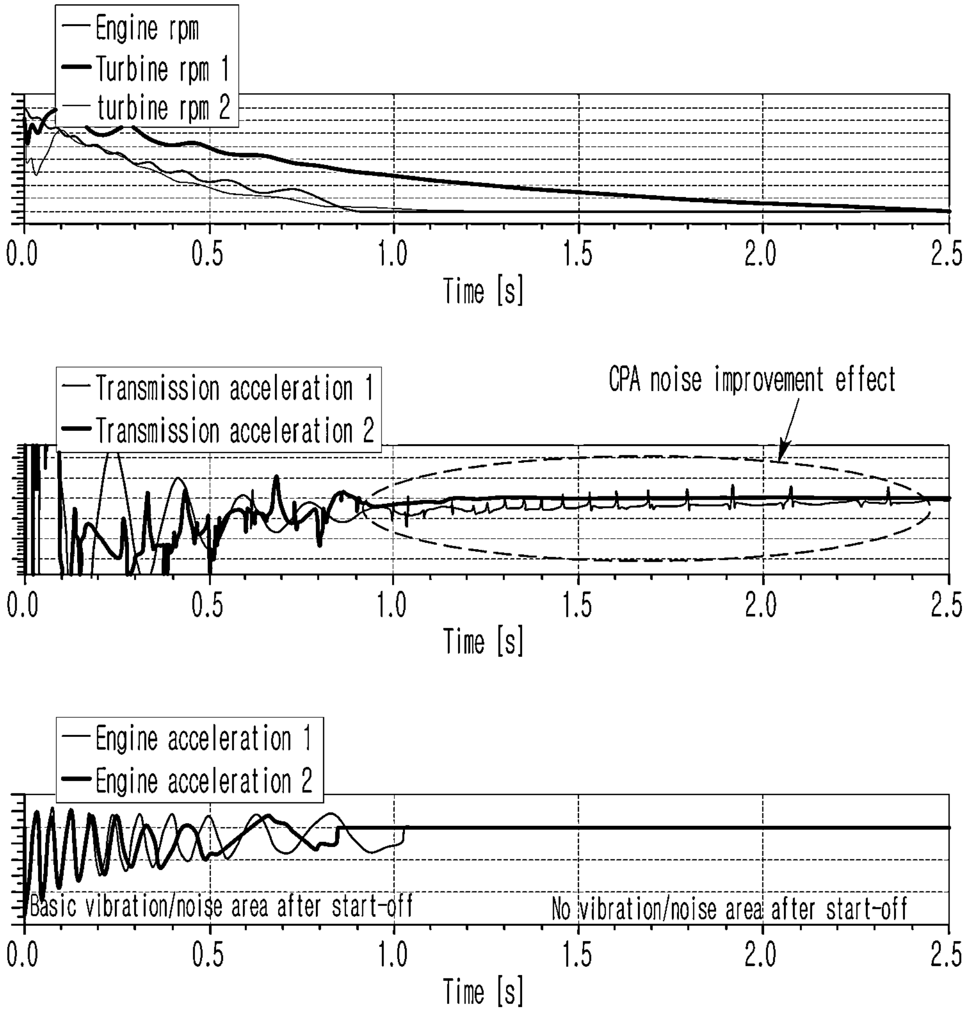
Figure 5:
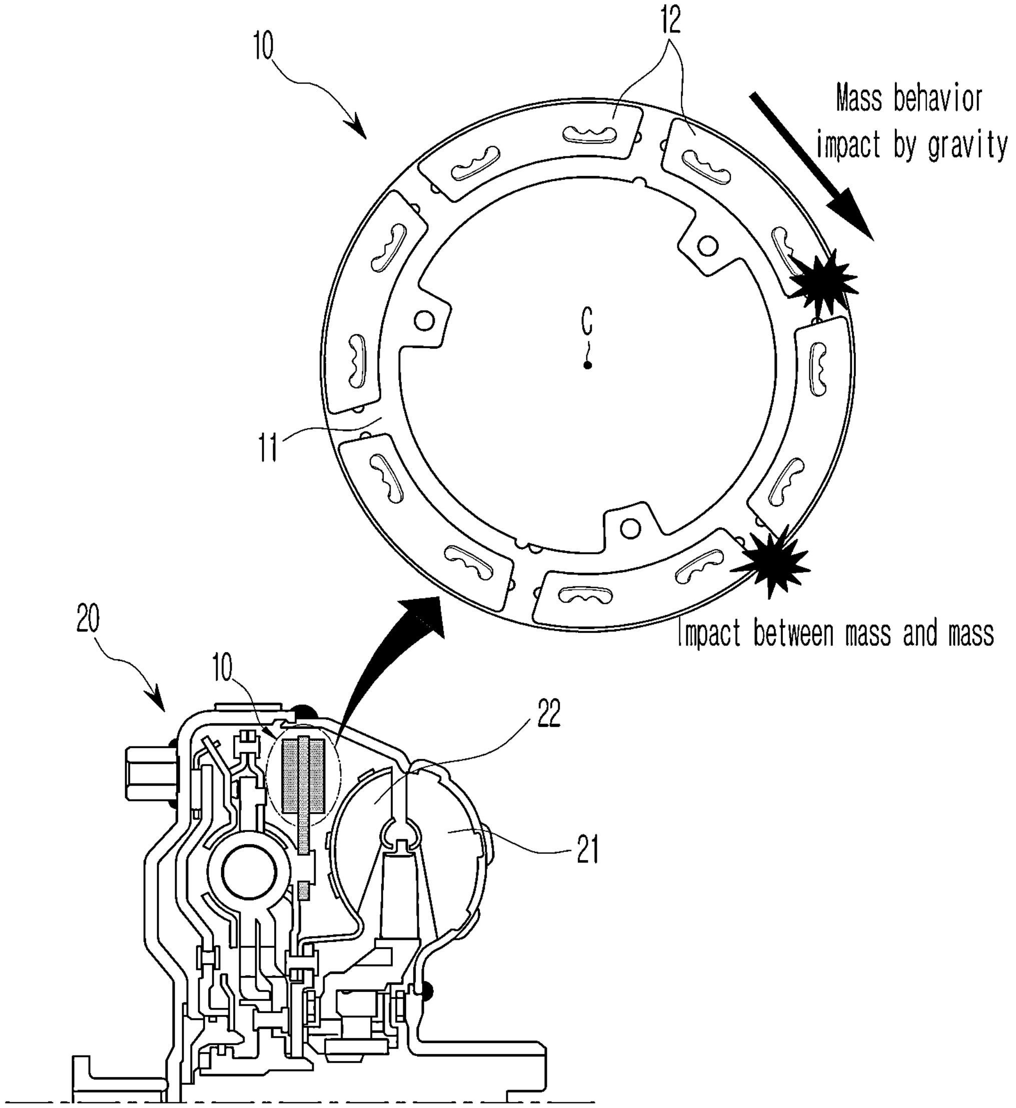
FIG. 5 (Prior Art)
FIGS. 5 and 6 illustrate a centrifugal pendulum absorber (CPA) applied to a driving system to a vehicle and a noise generation phenomenon thereof.
Figure 6:
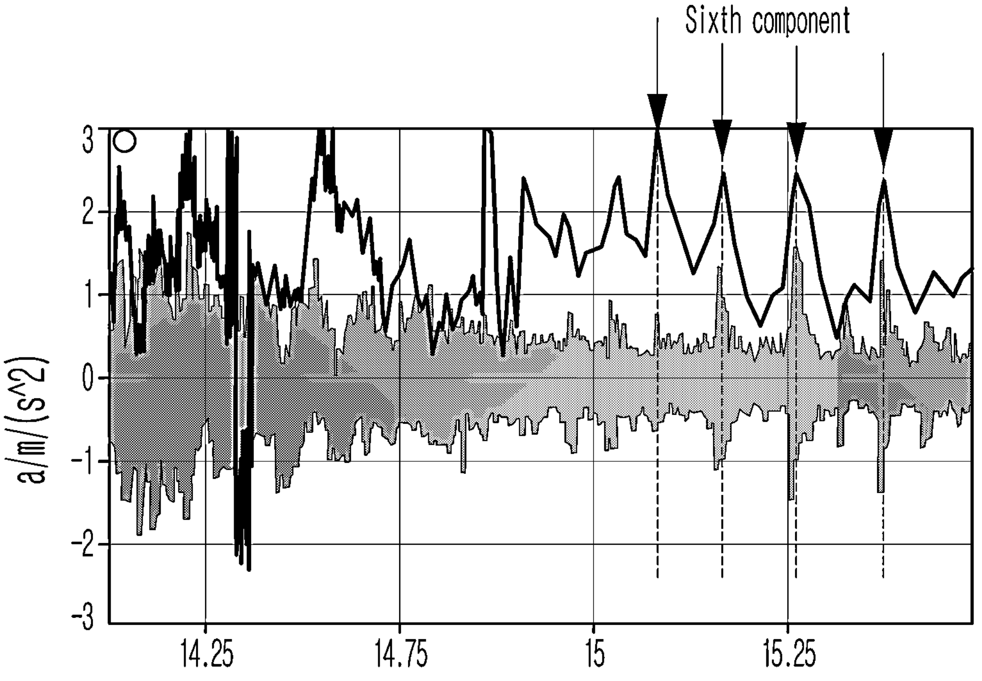
FIG. 6 (Prior Art)

Meanwhile, FIG. 4 illustrates a simulation comparison result before and after application of the method for improving vehicle noise according to an exemplary embodiment of the present disclosure.

Referring to FIG. 4, according to an exemplary embodiment of the present disclosure, there is a CPA noise improvement effect in which a CPA noise generation time is advanced to a turning-off operating time of an engine through noise improvement logic of the present disclosure upon turning-off a vehicle to prevent a driver from hearing noise.

Further, a CPA noise problem is improved through a program that applies the noise improvement logic to an existing control device without adding separate hardware to the vehicle to resolve a vehicle noise problem with low cost.

In addition, the method for improving the CPA noise of the present disclosure, which includes the effects is applied to multi-model/multi-type vehicles to expect a customer satisfaction enhancement effect depending on increased productivity.

The exemplary embodiments of the present disclosure are not limited to the above-described apparatus and/or method, but may be implemented through a program for implementing functions corresponding to the configuration of the exemplary embodiment of the present disclosure, a recording medium on which the program is recorded, and the like and the present disclosure can be easily implemented by those skilled in the art from the description of the exemplary embodiments described above.

While the embodiments of the present disclosure have been described above in detail, it is to be understood that the scope of the present disclosure is not limited to the disclosed embodiments, but, on the contrary, is intended to cover various modifications and equivalent arrangements included within the spirit and scope of the appended claims.

The invention claimed is:

1. A method for improving vehicle noise generated from a centrifugal pendulum absorber (CPA) after a vehicle turns off, the method comprising:
- collecting real-time driving information according to an operation of the vehicle through a driving information detector;
- determining whether an idle condition is satisfied based on the real-time driving information;
- determining whether a transmission P stage is engaged and whether a brake operates when the idle condition is satisfied;
- reducing rotation of a CPA mounted turbine applied to a torque converter through at least one of transmission clutch and brake operations at a time when an engine turning-off signal is input in a state of satisfying the transmission P stage engagement or brake operation condition;
- after determining whether the transmission P stage is engaged and whether the brake operates, engaging the transmission P stage immediately when the engine turning-off signal is input in a state of not satisfying the transmission P stage engagement and brake operation conditions of the vehicle; and
- reducing the rotation of the CPA mounted turbine applied to the torque converter through at least one of the transmission clutch and brake operations after the transmission P stage engagement.

2. The method of claim 1, wherein:
- in the reducing of the rotation of the CPA mounted turbine, a stop time of the turbine rotation is advanced so the rotation of the CPA mounted turbine stops in a same time zone as a turning-off operating time of an engine from a time of recognizing the engine turning-off signal.

3. The method of claim 2, wherein reducing the rotation of the CPA mounted turbine includes performing turbine rotation stop control by operating any one of an under-drive clutch (UD-C), an over-drive clutch (OD-C), and a low-reverse brake (LR-B) of a transmission.

4. The method of claim 1, wherein:
- in the reducing of the rotation of the CPA mounted turbine, a stop time of the turbine rotation is advanced so the rotation of the CPA mounted turbine stops in a same time zone as a turning-off operating time of the engine from a time of recognizing the engine turning-off signal.

5. A control device for improving vehicle noise generated from a centrifugal pendulum absorber (CPA) after a vehicle turns off, the control device comprising:

a driving information detector configured to detect real-time driving information required for controlling improvement of CPA noise from various sensors according to an operation of the vehicle; and a controller configured to reduce rotation of a CPA mounted turbine applied to a torque converter through at least one of transmission clutch and brake operations when an engine turning-off signal is input in a state of satisfying an idle condition according to the real-time driving information, and satisfying a transmission P stage engagement or brake operation condition;

wherein the controller is further configured to engage the transmission P stage immediately when the engine turning-off signal is input in a state of not satisfying the transmission P stage engagement and brake operation conditions of the vehicle, and then to reduce the rotation of the CPA mounted turbine applied to the torque converter through at least one of the transmission clutch and brake operations.

6. The control device of claim 5, wherein:

the driving information detector is further configured to detect real-time driving information including at least one of an engine start state (ON/OFF), an engine RPM, a transmission (TM) state, a TM clutch state, a brake pedal sensor (BPS), and a vehicle speed, and delivers the detected real-time driving information to the controller.

* * * * *